Feb. 18, 1969   F. J. CALLAHAN, JR., ET AL   3,428,291
BELLOWS METERING VALVE

Filed May 24, 1965   Sheet 1 of 2

INVENTORS.
FRANCIS J. CALLAHAN, JR.
BERNARD J. GALLAGHER,
JOHNATHAN TASKER &
EARL D. SHUFFLEBARGER
BY  *Fay & Fay*
ATTORNEYS

INVENTORS.
FRANCIS J. CALLAHAN, JR.
BERNARD J. GALLAGHER,
JOHNATHAN TASKER &
EARL D. SHUFFLEBARGER
BY Fay & Fay
ATTORNEYS

United States Patent Office 3,428,291
Patented Feb. 18, 1969

3,428,291
BELLOWS METERING VALVE
Francis J. Callahan, Jr., Chagrin Falls, and Bernard J. Gallagher, Cleveland Heights, Ohio, Jonathan Tasker, Ann Arbor, Mich., and Earl D. Shufflebarger, Bedford, Ohio, assignors to Nuclear Products Company, Cleveland, Ohio, a corporation of Ohio
Filed May 24, 1965, Ser. No. 458,013
U.S. Cl. 251—122                                10 Claims
Int. Cl. F16l 55/02; F16k 31/44; E03b 11/16

ABSTRACT OF THE DISCLOSURE

A metering valve having a base portion with a fluid passage therethrough. An elongated bore in the base opens upwardly and intersects the fluid passage. Coaxial with the elongated bore is a bonnet having a central bore, which is secured to the base. A unitary stem is reciprocally received in the bonnet and has its lower end extending into the elongated bore. A bellows surrounds part of the stem and has the upper end attached thereto and the lower end secured to the base. Oppositely directed threads are located at the upper end of the stem and bonnet and are engaged by an actuator for the stem.

---

This invention relates to valves and more particularly to a bellows metering valve with differential threads on the actuating mechanism for accurate control of fluid flow through the valve.

It is an object of this invention to provide an improved metering valve utilizing a bellows.

Another object of the invention is to provide a metering valve which employs a metal bellows with the bellows, together with the fluid pressure in the system, functioning in a more effective manner than the springs heretofore employed in such valves.

It is a further object of the invention to provide a bellows metering valve which may be easily assembled.

Another object of the invention is to provide a bellows metering valve which is of all metal construction thereby permitting use of the valve in connection with a wide range of temperatures and pressures and with diverse fluids.

A further object of the invention is to provide a bellows metering valve with novel means for nonrotatably securing the valve stem in the valve body.

A more specific object of the invention is to provide a bellows metering valve wherein there is positive control of the stem both in the opening and closing movements of the valve thereby assuring accurate flow control over the entire range of flow rates.

Another specific object of the invention is to provide a bellows metering valve which employs a novel threaded interconnection between the valve actuator and the valve stem so that the valve is accurately adjustable throughout the entire range of flow rates and more easily operable at high pressures.

A still further specific object of the invention is to use, is a bellows metering valve, a stem actuating mechanism which includes a differential thread mechanism thereby permitting extremely fine adjustments of the flow rate through the valve without the necessity of using complex and expensive connections between the actuator and the stem.

Another object of the invention is to provide, in a bellows metering valve, a nonrotating stem with guides on the upper and lower ends of the stem thereby assuring accurate seating of the valving member relative to the valve seat.

A further object of the invention is to provide a unitary stem assembly with positive stops for the upper and lower limits of stem travel thereby to prevent overtightening of the valve in the closing position and disassembly of the valve during the opening operation.

It is still another object of the invention to provide a metering valve which includes a vernier scale for accurately measuring the flow through the valve together with novel means for calibrating the valve.

These objects and features, as well as others which will become more apparent upon a complete reading of the specification, have distinct advantages over the known prior art devices. Thus, the application of a differential threaded connection between the actuator and the valve stem in a metering valve of the type herein disclosed permits accurate flow control over the entire range of the valve's flow capacity. Heretofore, this has been accomplished only by the provision of extremely fine threads which would permit the minute adjustments of the stem necessary to accomplish the flow control. This is not the case with the instant invention wherein coarse threads may be used without any sacrifice in sensitivity but with a decided decrease in manufacturing cost and increase in thread strength. The latter, of course, ultimately often sets the operating pressure capabilities of the valve. Thus, the threaded connection employed in the present invention contemplates relatively coarse threads on the exterior of the bonnet with somewhat finer threads on a projecting end of the valve stem. An actuator is threadedly received over the bonnet and the stem so that as the actuator is rotated, the stem is advanced an amount equal to the difference between the pitches of the two threaded connections. With this arrangement, a decided mechanical advantage is obtained thereby rendering the valve easily operable at high pressures. Moreover, less torque is applied to the stem so that the possibility of a bellows rupture is significantly decreased.

The unitary stem configuration eliminates any possibility of play in the parts which would affect the sensitivity of the control. In addition, positive control of the valve stem is possible in both the opening and closing movements of the stem. In this respect, the mechanical interconnection between the threaded stem parts permits complete control by the operator over the full range of stem travel. Distinguished from this are the prior art valves which have relied on a spring to overcome any play or slack either in the threaded connections or in the other parts of the valve as well as to bias the valve stem to an open position. The bellows employed herein replaces the spring and achieves a self-opening and biasing function under the natural expansive influence of the bellows as well as through utilization of the fluid pressure in the system. Thus, the bellows together with the fluid pressure which is admitted to the interior of the bellows, tends to bias the stem to an open position thereby assuring that any slack in the threads is uniformly compensated for by a continual bias of the stem in the same direction at all times. Naturally, when the valve is used in vacuum service, the biasing function of the bellows is sufficient, together with the threaded interconnection between stem parts, to overcome the force effects of the vacuum.

Other objects, features and advantages will become more apparent upon a complete reading of the following description which sets forth in detail but one approved means of carrying out the invention. Such disclosed means is not meant to be limiting inasmuch as it constitutes but one of the various ways in which the principles of the invention may be applied.

In the drawings wherein like reference numerals indicate like parts in the various views.

Figure 1:
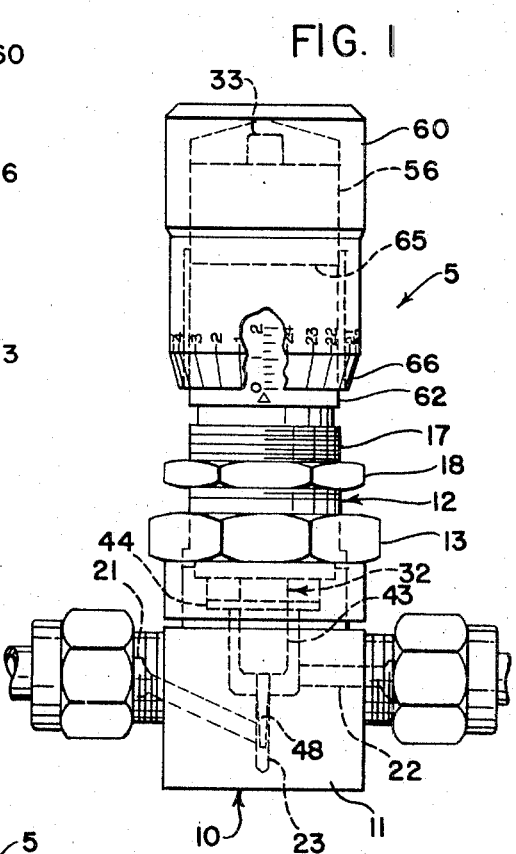
FIG. 1 is a view in elevation of the valve with fragmentary portions of the inlet and outlet shown together with portions of the interior of the valve shown in phantom.
Figure 2:
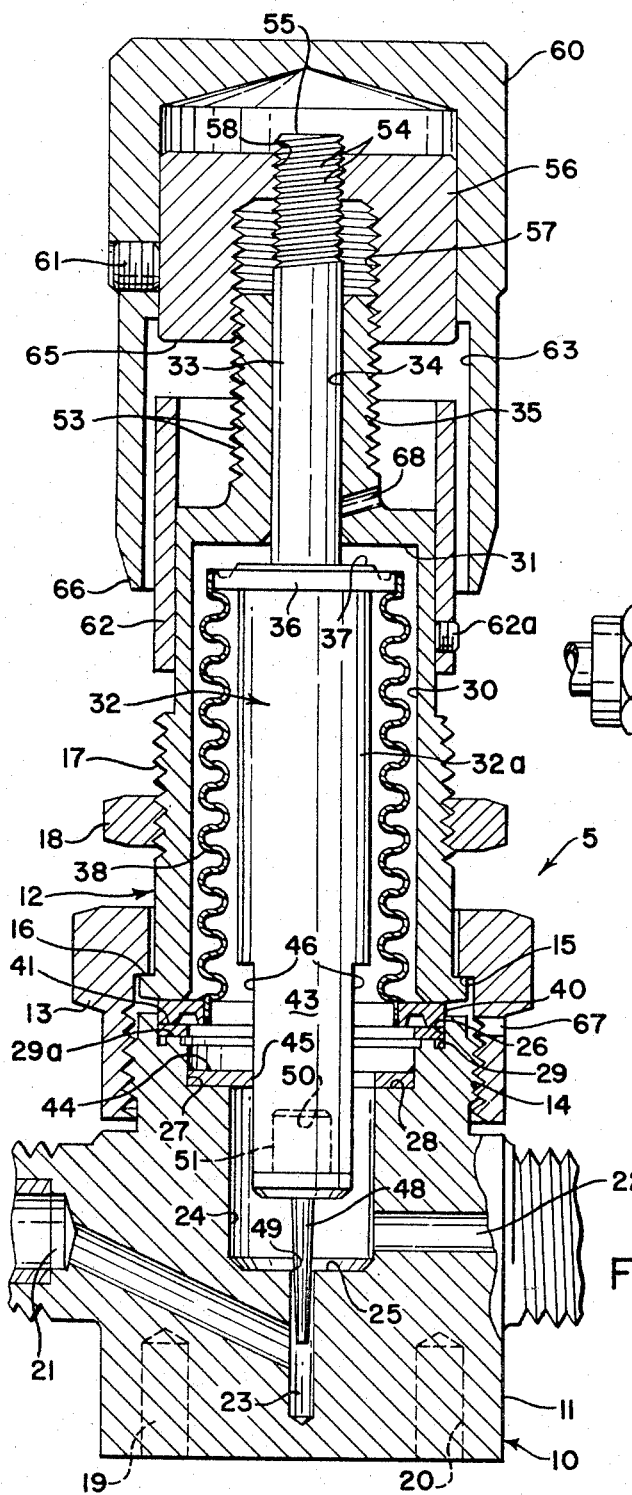
FIG. 2 is an enlarged elevation view in section of the valve of FIG. 1 illustrating the relative position of the parts when the valve is partially open.
Figures 3, 4:
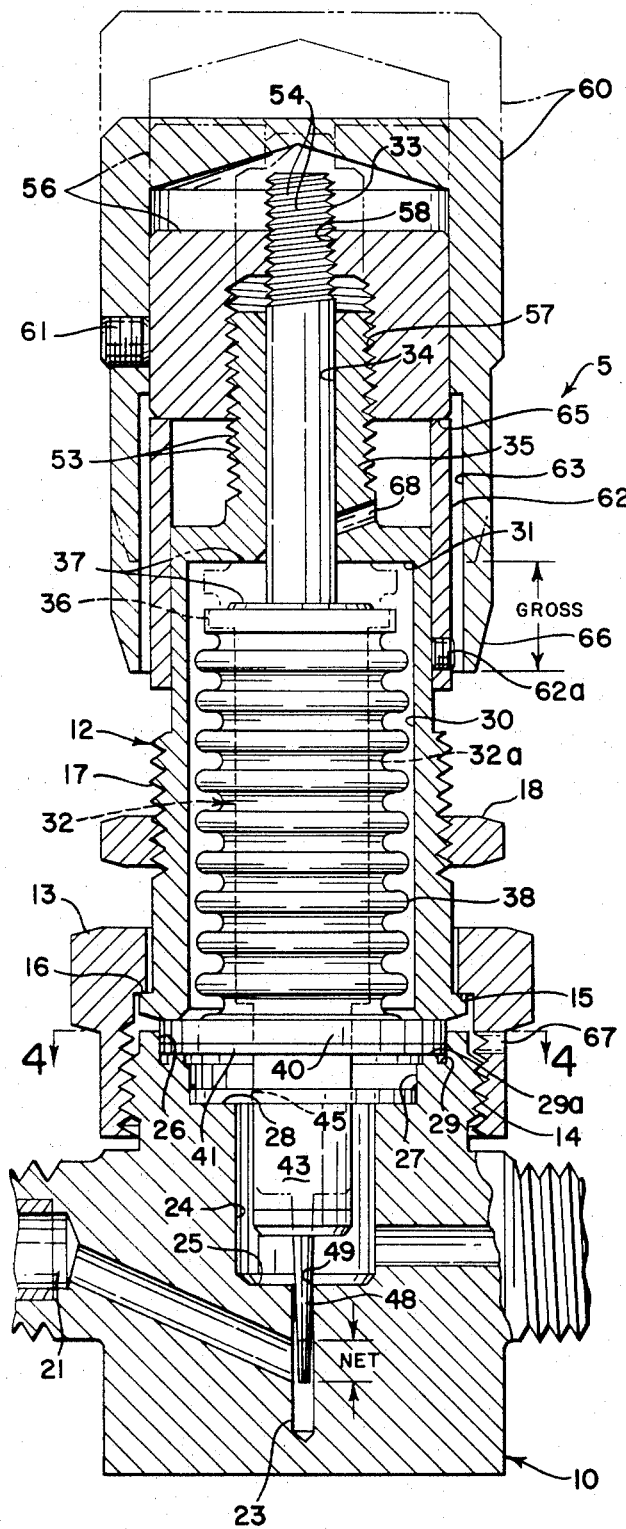
FIG. 3 is a view similar to FIG. 2 illustrating the position of the parts in the fully closed and fully open positions.
FIG. 4 is a view taken along line 4—4 of FIG. 3.

Referring now to FIGS. 1 and 2, the valve 5 includes a body 10 consisting of base portion 11 and bonnet 12. A bonnet nut 13 interconnects the base 11 and bonnet 12 by the interfitting threads indicated at 14. The bonnet nut 13 has a flanged portion 15 which engages a flange 16 on the lower end of the bonnet 12 thereby to hold the bonnet in place when the parts are joined together.

The bonnet 12 is externally threaded as at 17 to receive a mounting nut 18 which is usable to secure the valve 5 on a panel mounting if it is so desired. The panel would be secured between the nut 18 and the bonnet nut 13 in a known manner. Tapped holes 19 and 20 may be provided in the base 11 for convenience in mounting in the event a panel mounting is not feasible or desired.

The base 11 is provided with an inlet 21 and an outlet 22, the former of which extends into a bore or orifice 23. The bore 23 is coaxial with an enlarged bore or valve chamber with a shoulder 25 formed at the juncture of the bores 23 and 24. The enlarged bore 24 communicates with the outlet 22 adjacent the shoulder 25. The vertical extending bore 24 is coaxial with a first counterbore 26 and a second counterbore 27 in the upper portion of the base 11. A transverse shoulder 28 is formed at the juncture of the bore 24 and the counterbore 27 with a shoulder 29 also formed at the juncture of the first counterbore 26 and the second counterbore 27.

The bonnet 12 is provided with a central bore or cavity 30 with an end wall 31. A valve stem 32 is received in the cavity 30 in the bonnet 12. The upper end 33 of the stem 32 is of reduced diameter with respect to the central portion of the stem and extends through a bore 34 in an upper reduced portion 35 of the bonnet 12. The diameters of the upper stem 33 and the bore 34 are closely mating so that there is an enlarged area of guiding support for the upper end of the stem.

An integral transverse flange 36 is provided on the stem at the juncture of the reduced diameter portion 33 and the central portion 32a of the stem. The flange includes an upper surface 37 which is adapted to engage the end wall 31 of the cavity 30. A fluid impervious metallic bellows 38 is joined to the outer periphery of the flange 36 with the bellows surrounding the central portion of the stem 32. The central portion 32a of the stem is generally cylindrical in configuration with the diameter of the central portion being slightly less than the inside diameter of the bellows 38. An annular ring 40 and a gasket 41 are clamped between the shoulder 29 in the counterbore 26 and the lower end of the bonnet 12. The abutting surfaces of the ring 40 and the gasket 41 are machined to provide a seal therebetween. The gasket 41 rests on a circumferential rib 29a which is formed in the shoulder 29 with the abutting surfaces of the gasket and the rib also machined to provide a seal. The use of a rib such as 29a permits concentration of the clamping force thereby enhancing the sealing characteristics at the juncture between the bonnet and the body. The lower end of the bellows 38 is secured to the inner periphery of the annular ring 40 in the manner illustrated in FIG. 2.

The lower end 43 of the stem 32 projects into the elongated bore 24 in the base 11. An annular guide washer 44 is received in the counterbore 27 and rests against the shoulder 28. The washer is normally welded in the body 11 so that it is restrained from movement relative to the base. The washer 44 includes a substantially D-shaped opening through which the lower end 43 of the stem projects. The D-shape is formed by a flat 45 formed on the inner periphery of an otherwise circular passage through the washer. A corresponding flat 46 is formed on opposed surfaces of the lower portion 43 of the stem so that when the valve is assembled, one of the flats 46 is in engagement with the flat 45 on the washer 44. It is readily apparent that with the washer 44 secured to the base, rotation of the stem 32 is prevented. Moreover, the dimensions of the end 43 of the stem closely mate with the dimensions of the D-shaped opening so that the washer 44 serves as a fixed guide for the stem as the stem is reciprocated.

The milled flats 46 which constitute an interrupted peripheral portion on the lower end 43 of the stem 32 extend along the entire length of the lower end 43 of the stem thereby facilitating ingress and egress of fluids into and from the bellows chamber. The flats 46 thus facilitate the purging of any fluid that may be trapped in the chamber and also permit the introduction of fluid under the pressure of the system into the chamber thereby facilitating the operation of the valve. It is obvious that any number of flats or equivalent may be provided on the stem so long as there remains sufficient surface on the end 43 to perform the guiding function with the washer 44.

The lower tip of the stem is provided with a slender, elongated needle 48 which, in the embodiment illustrated in FIG. 2, is illustrated as being frusto-conical in configuration and is adapted to engage with the peripheral lip 49 of the bore or orifice 23. The needle 48 is ordinarily chrome plated and of greater hardness than the hardness of the lip 49 thereby assuring a sealing engagement between the needle and the lip. As shown in FIG. 2, the needle 48 is separable from the lower end 43 of the stem 32. This is accomplished by a bore 50 formed in the lower end of the stem. With such an arrangement, the relative hardnesses of the needle may be varied in accordance with the hardness of the seat and also the dimensions of the needle may be varied to accommodate various flow rates.

The above described structure thus provides a bellows valve in which the stem is guided at its lower end by the washer 44 and at its upper end by the bore 34 cooperating with the upper end 33 of the stem. Rotation of the stem is prevented by the interaction of the flat 45 on the washer 44 and the corresponding flats 46 on the stem 32. This is particularly important in a bellows valve wherein torsional forces applied to the bellows rapidly causes a rupture of the bellows and consequent leakage of the fluid in the system.

External threads 53 are provided on the reduced diameter portion 35 of the bonnet 12. Threads 54 are also provided on the uppermost end 55 of the stem 32. A cup-shaped actuator 56 with a threaded central cavity 57 is received over the upper end 35 of the bonnet and in threaded engagement with the threads 53. The actuator includes a threaded bore 58 which is coaxial with the cavity 57 and which is, in the assembled condition, in threaded engagement with the threads 54 on the stem 32. Thus, the actuator 56 is threaded on the bonnet and also threadedly interconnected with the stem. The pitch of the bonnet threads 53 is coarser than the pitch of the stem threads 54. As a specific example, the pitch of the threads 53 may be 32, while the stem threads may have a pitch of 56. These are purely exemplary values and the significant relationship in the provision of a relatively fine thread on the stem with a relatively coarse thread on the bonnet.

With this arrangement, it is apparent that as the actuator 56 is rotated relative to the bonnet and the stem, the stem advances a net amount equal to the difference in the pitch between the bonnet and stem threads. Thus, by this differential threading arrangement, it is possible to have positive control of the stem all the way into the seating position in the bore 23 and back out again so that needed flows can be set with accuracy from zero to whatever upper limit of flow the valve is capable of carrying.

Another significant advantage of this arrangement is that by maintaining the ratio between the pitch of the bonnet threads and the pitch of the stem threads at a relatively small value, the same net advance can be obtained regardless of whether the threads are coarse or fine. As a result, the use of fine threads or coarse threads may be based on considerations other than the flow capacity and the metering capacity of the valve. Moreover, a significant mechanical advantage is obtained by the differential threading arrangement so that the valve is easier to operate in application where the valve is being used at extremely high pressures. Of course, an additional advantage is the fact that extremely fine adjustments of the valve are obtainable by the differential threading principle with the result that a valve having greatly enhanced metering capabilities is obtainable without the expense of extremely fine threads.

As a means for operating the actuator 56, there is a cap 60 which is received over the actuator and encloses the upper portion 35 of the bonnet 12. A set screw 61 interconnects the cap with the actuator 56 so that the actuator and the cap are secured for unitary movement. The cap 60 further includes a counterbored portion 63. A vernier scale on a sleeve or ring 62 is received over the bonnet 12 and secured by a set screw 62a to the bonnet. This vernier scale is adapted to be received in the counterbore 63 and cooperate with appropriate indicia, as shown in FIG. 1, on the cap 60 so that the flow through the valve may be accurately indicated. The end of the sleeve 62 is adapted to abut the end 65 of the actuator 56 thereby providing a positive stop for the actuator in the closing operation of the valve. In similar fashion, the transverse surface 37 on the radial flange 36 is adapted to cooperate with the end wall 31 thereby preventing disengagement of the actuator from the bonnet and the stem. In addition, the surfaces 31 and 37 are finely lapped and provided a back seat which forms a fluidtight joint when the stem is fully retracted thereby protecting against leakage along the valve stem in the event of a bellows failure.

The cooperation between the sleeve 62 and actuator 56 also provides a novel means whereby the valve may be calibrated. Thus, the cap 60 is secured to the actuator 56 so that the end 66 of the cap is aligned with the zero setting on sleeve 62 when the sleeve abuts the actuator. With this accomplished, the cap 60 may be rotated until needle 48 is seated and no flow is permitted through the valve. The sleeve 62 is then moved along the bonnet until it abuts the end 65 of the actuator 56. At this position, the set screw 62a is tightened so that the sleeve is secured to the bonnet thereby assuring that the vernier scale will indicate zero when the valve is closed.

Leak test ports 67, 68 are strategically located in the valve and provide a means whereby a test fluid such as helium may be introduced under pressre to determine if there is any leakage in the critical joints of the valve.

For ease of description, the principles of the invention have been set forth in connection with but a single illustrated embodiment. It is not intended that this illustrated embodiment nor the terminology employed in describing it is to be limiting inasmuch as variations may be made without departing from the spirit of the invention; rather, we desire to be restricted only by the scope of the appended claims.

We claim:

1. A metering valve comprising a base portion having a fluid passage therethrough;
    an elongated bore in said base portion opening upwardly thereof and intersecting said fluid passage at its lower end;
    said lower end of said bore having a small internal diameter relative to the upper end of said bore and forming a shoulder with the upper end of said bore;
    a bonnet having a central bore coaxial with said elongated bore abutting said base portion;
    means securing said bonnet to said base portion;
    a unitary stem reciprocally received in said bore in said bonnet, with the lower end of said stem being needle-like and extending into the lower end of said elongated bore in said base portion;
    a bellows surrounding a portion of said stem and having the upper end thereof attached to said stem;
    means securing the lower end of said bellows to said base portion;
    an opening in the upper end of said bonnet coaxial with said aforementioned bores;
    the upper end of said stem extending through said opening in said bonnet;
    thread means on said upper end of said stem;
    thread means on said upper end of said bonnet, the pitch of said bonnet threads being different from the pitch of said stem threads;
    an actuator in threaded engagement with said threaded upper end of said stem and said threads on said bonnet whereby said actuator may be rotated relative to said bonnet and said stem.

2. The valve of claim 1 wherein the threads on said stem are finer than the threads on said bonnet.

3. The combination of claim 1 wherein said threads on said bonnet are on a reduced diameter portion of said bonnet;
    said actuator comprising a cup-shaped member having an interior cavity in threaded engagement with said bonnet threads;
    the external diameter of said actuator being greater than the diameter of said bonnet;
    an opening in said actuator coaxial with said cavity and being in threaded engagement with said stem threads;
    a cup-shaped cap having a central cavity therein;
    the diameter of said central cavity being substantially equal to the diameter of said actuator, with said cap being received over said actuator; and
    means securing said cap to said actuator for rotation therewith.

4. The combination of claim 3 and including:
    a counterbore in said cap coaxial with said cavity in said cap with a portion of said central portion of said bonnet extending into said counterbore.

5. A valve comprising a base portion having a fluid passage therethrough;
    an elongated bore in said base portion opening upwardly thereof and intersecting said fluid passage at its lower end;
    a bonnet having a central bore coaxial with said elongated bore abutting said base portion;
    means securing said bonnet to said base portion;
    a unitary stem reciprocally received in said bore in said bonnet, with the lower end of said stem extending into said elongated bore and said base portion, said opening in said bonnet being of a diameter closely mating with the diameter of said portion of said stem extending therethrough;
    lower guide means extending into said elongated bore in said base portion and being in sliding engagement with the stem thereby providing a guiding relationship for the lower portion of said stem;
    a bellows surrounding a portion of said stem and having the upper end thereof attached to said stem;
    means securing the lower end of said bellows to said base portion;
    an opening in the upper end of said bonnet coaxial with said aforementioned bores;
    the upper end of said stem extending through said opening in said bonnet;
    thread means on said upper end of said stem;
    thread means on said upper end of said bonnet;
    an actuator in threaded engagement with said threaded upper end of said stem and said threads on said bonnet whereby said actuator may be rotated relative to said bonnet and said stem.

6. The valve of claim 5 wherein said lower guide means comprises an annular washer having a D-shaped opening therethrough;
an interrupted peripheral portion on said stem in engagement with the flat defined by said D-shaped opening whereby said stem is restrained from rotation relative to said base and said bellows.

7. A valve comprising:
a base portion having a fluid passage therethrough;
an elongated bore in said base portion opening upwardly thereof and intersecting said fluid passage at its lower end;
a shoulder defining a valve seat at the intersection of of the bore in the passage;
first and second coaxial counterbored portions in said base portion coaxial with the opening of said elongated bore;
a ring carried by said base portion in said first counterbore;
a bonnet having a central bore coaxial with said elongated bore abutting said ring;
clamping means associated with said base portion and said bonnet and being adapted to clamp a portion of said ring between said base and said bonnet;
a stem reciprocally received in said bore in said bonnet with the lower end of said stem extending into said elongated bore in said base portion;
said lower end of said stem including an elongated needle member adapted to extend through said valve seat;
an annular guiding washer in said second counterbore surrounding said lower end of said stem and being in guided engagement therewith;
said lower end of said stem including an interrupted peripheral portion thereon cooperating with a similarly configured portion on the inner periphery of said washer whereby said stem and said washer are rotationally immovable relative to each other;
means securing said washer to said base portion;
a radially extending flange on said stem intermediate its ends;
a bellows surrounding said stem and having one end thereof attached to the outer margin of said radially extending flange;
means securing the other end of said bellows to the inner periphery of said ring;
said interrupted peripheral portion on said stem extending along said stem into the interior of said bellows whereby the flow of fluid into said bellows is facilitated;
an opening in the upper end of said bonnet coaxial with said aforementioned bores;
said stem extending through said opening in said bonnet;
thread means on said upper end of said stem;
thread means on said upper end of said bonnet;
an actuator threaded over said threaded upper end of said stem and said threaded upper end of said bonnet;
the threads on said stem being finer than the threads on said bonnet;
a cap received over said actuator; and
means interconnecting said cap with said actuator for unitary movement.

8. A metering valve comprising:
a base portion having a fluid passage therethrough;
an elongated bore in said base portion opening upwardly thereof and intersecting said fluid passage at its lower end;
said lower end of said bore having a small internal diameter relative to the upper end of said bore and forming a shoulder with the upper end of said bore;
a bonnet having a central bore coaxial with said elongated bore abutting said base portion;
means securing said bonnet to said base portion;
a unitary stem reciprocally received in said bore in said bonnet, with the lower end of said stem being needlelike and extending into the lower end of said elongated bore in said base portion;
the upper end of said bonnet having a diameter less than the diameter of the lower end of said bonnet with a transverse shoulder at the juncture of said upper and lower portions of said bonnet;
an opening in the upper end of said bonnet coaxial with said central bore;
said stem having a reduced diameter upper end extending through said opening in said bonnet;
transverse shoulder means on said stem in the region of said reduced diameter upper end;
the lower end of said stem including a valving member adapted to end said fluid passage whereby flow of fluid through said passage may be regulated;
thread means on the exterior end of said upper end of said bonnet;
thread means on said upper end of said stem;
the threads on said stem being finer than the threads on said bonnet;
actuator means in threaded engagement with said threads on said stem and said bonnet;
means restraining rotation of said stem;
said actuator means being rotatable and movable between a first position wherein said actuator engages a sleeve on said bonnet and a second position wherein said transverse shoulder means on said stem engages a wall at the top end of said central bore in said bonnet.

9. The valve of claim 8 wherein said actuator means comprises:
a cup-shaped member having an interior cavity in threaded engagement with said bonnet threads and an opening coaxial with said cavity and in threaded engagement with said stem threads;
a cup-shaped cap having a central cavity therein with said cap enclosing said cup-shaped members in said central cavity; and
means securing said cap to said cup-shaped member for rotation therewith.

10. The combination of claim 9 wherein said cap encloses said upper portion of said bonnet and a portion of said lower portion of said bonnet.

References Cited
UNITED STATES PATENTS

| | | | |
|---|---|---|---|
| 1,912,383 | 6/1933 | Pardee | 137—505.12 |
| 2,234,052 | 3/1941 | Luenz | 137—556.3 |
| 3,097,662 | 7/1963 | Peters | 251—335 X |
| 3,295,191 | 1/1967 | Gallagher et al. | 251—335 X |
| 3,322,142 | 5/1967 | Baumann | 251—335 X |
| 3,326,512 | 6/1967 | Clarke | 251—335 X |
| 3,331,377 | 7/1967 | Castello | 251—355 X |

M. CARY NELSON, *Primary Examiner.*

ROBERT C. MILLER, *Assistant Examiner.*

US. Cl. X.R.

251—265, 284; 137—556.3